(No Model.)
C. H. LAND.
MANUFACTURE OF COMPOUND ALUMINIUM PLATES.
No. 440,952. Patented Nov. 18, 1890.
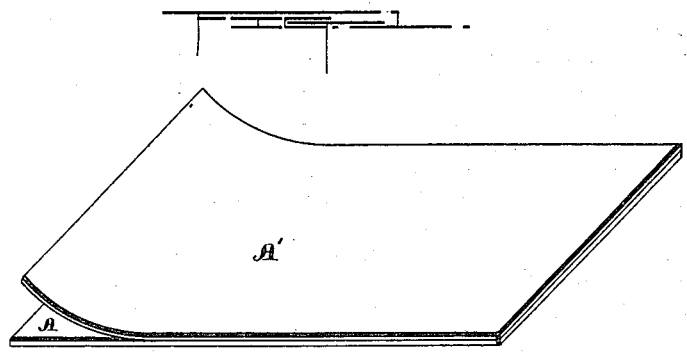
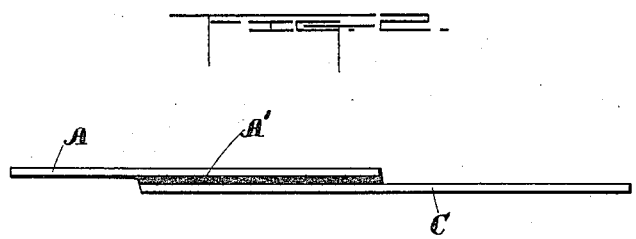
Witnesses  Chas. H. Land Inventor

UNITED STATES PATENT OFFICE.

CHARLES H. LAND, OF DETROIT, MICHIGAN.

MANUFACTURE OF COMPOUND ALUMINIUM PLATES.

SPECIFICATION forming part of Letters Patent No. 440,952, dated November 18, 1890.

Application filed September 1, 1890. Serial No. 363,666. (No model.)

*To all whom it may concern:*

Be it known that I, CHARLES H. LAND, a citizen of the United States, residing at Detroit, county of Wayne, State of Michigan, have invented certain new and useful Improvements in the Manufacture of a Compound Aluminium Plate; and I declare the following to be a full, clear, and exact description of the invention, such as will enable others skilled in the art to which it appertains to make and use the same, reference being had to the accompanying drawings, which form a part of this specification.

My invention relates to the manufacture of a compound aluminium plate adapted for the ready union therewith of other metals and substances, as hereinafter described and claimed, and illustrated in the accompanying drawings, in which—

Figure 1 represents such a compound plate. Fig. 2 represents such a plate having an additional metallic plate united therewith.

Heretofore great difficulty has been experienced in soldering upon aluminium; but I have discovered that pure tin will unite with aluminium at a proper temperature, provided the heated metal is burnished over the surface of the aluminium.

The operation of burnishing or rubbing the surface of the aluminium is accomplished while the aluminium is immersed in melted tin. This secures a thin film of tin upon the surface of the aluminium, thus establishing upon said surface a base or foundation suitable to readily receive various forms of solder well known in the tinker's art. I also find that any desired quantity of pure tin may be used in connection therewith as a solder, or be united thereto in any thickness as a plating. So, also, other metals—as copper, brass, galvanized iron, &c.—formed into plate may have a coat of tin adhering to their surface, and by pressing the tinned surface of the aluminium plate and the tinned surface of the brass, copper, or other tin-coated plate together under the application of heat they may be caused to thoroughly unite. By raising the temperature sufficiently the metal plates may be thus readily sweated together in a firm and substantial manner. In this manner it is my design to produce as an article of manufacture a compound plate of aluminium having pure tin thus united thereto.

As shown in the drawings, A represents a plate of aluminium provided, as above described, with a tinned surface at A'.

C is an additional metallic plate sweated thereupon, as hereinbefore described.

The aluminium plate being provided with a coat of tin on its face makes it possible to use either pure tin or various low-grade solders as an attaching means to secure aluminium facings to other metals, or the union may be formed by the use of amalgam. This, it will be seen, is a matter of much utility and importance, possessing many advantages in many ways. Thus, for example, in ornamental work of numerous kinds it becomes possible to readily unite aluminium facings to various other surfaces.

In the manufacture also of aluminium air-cylinders the aluminium plate may be first wound into a cylinder of as many thicknesses as may be desired and sweated together. A tin-coated aluminium wire may then be wound likewise about the cylinder and sweated thereupon, thus producing remarkably light air-cylinders that will sustain a very great pressure, serviceable in carrying condensed air.

My invention contemplates tinning aluminium in any form in the manner hereinbefore described.

What I claim as my invention is—

1. A compound metallic plate or otherwise shaped metallic body consisting of aluminium provided with a tinned surface, substantially as set forth.

2. The process herein set forth of manufacturing a compound aluminium plate or other aluminium body provided with a tinned surface, consisting of burnishing tin upon a surface of the aluminium at a desired temperature, substantially as set forth.

3. The process of attaching aluminium facings to various surfaces, consisting of tinning a face of the aluminium in the manner described, and attaching the same to said surface, as herein set forth.

In testimony whereof I sign this specification in the presence of two witnesses.

CHARLES H. LAND.

Witnesses:
N. S. WRIGHT,
CHAS. F. SALOW.